US011012860B2

(12) United States Patent
Phan et al.

(10) Patent No.: US 11,012,860 B2
(45) Date of Patent: May 18, 2021

(54) METHOD AND AN APPARATUS FOR PUBLISHING ASSERTIONS IN A DISTRIBUTED DATABASE OF A MOBILE TELECOMMUNICATION NETWORK AND FOR PERSONALISING INTERNET-OF-THINGS DEVICES

(71) Applicant: GEMALTO SA, Meudon (FR)

(72) Inventors: Ly Thanh Phan, Meudon (FR); Ilan Mahalal, Meudon (FR)

(73) Assignee: Thales Dis France SA, Meudon (FR)

( * ) Notice: Subject to any disclaimer, the term of this patent is extended or adjusted under 35 U.S.C. 154(b) by 141 days.

(21) Appl. No.: 16/099,344

(22) PCT Filed: May 22, 2017

(86) PCT No.: PCT/EP2017/062232
§ 371 (c)(1),
(2) Date: Nov. 6, 2018

(87) PCT Pub. No.: WO2017/207314
PCT Pub. Date: Dec. 7, 2017

(65) Prior Publication Data
US 2019/0124512 A1  Apr. 25, 2019

(30) Foreign Application Priority Data

Jun. 3, 2016 (EP) .................................... 16305645

(51) Int. Cl.
*H04W 12/08* (2021.01)
*H04W 12/04* (2021.01)
(Continued)

(52) U.S. Cl.
CPC ............ *H04W 12/08* (2013.01); *G06F 16/27* (2019.01); *H04L 63/064* (2013.01);
(Continued)

(58) Field of Classification Search
None
See application file for complete search history.

(56) References Cited

U.S. PATENT DOCUMENTS

2014/0086177 A1* 3/2014 Adjakple ............... H04L 67/10
370/329
2014/0143826 A1* 5/2014 Sharp ................... H04L 63/105
726/1
(Continued)

FOREIGN PATENT DOCUMENTS

EP 2894890 A1 * 7/2015 ........ H04W 12/0802
EP 2894890 A1 7/2015
(Continued)

OTHER PUBLICATIONS

Jover, Roger et al. "dHSS—Distributed Peer-to-Peer implementation of the LTE HSS based on the Bitcoin/Namecoin architecture". [online] IEEE, May 23, 2016. [Retrieved on Jul. 27, 2020]. Retrieved from the internet: URL: https://ieeexplore.ieee.org/stamp/stamp.jsp?tp=&arnumber=7503813 (Year: 2016).*
(Continued)

*Primary Examiner* — Taghi T Arani
*Assistant Examiner* — Joshua Raymond White
(74) *Attorney, Agent, or Firm* — The Jansson Firm; Rehr B. Jansson

(57) ABSTRACT

This invention relates to a method for granting, for a mobile device which is not provisioned with a subscription to access a wireless network, the establishment of an initial wireless communication over a second wireless network (Se-PLMN) operated by a second wireless network operator (Se-MNO), the mobile device belonging to a user, the method comprising the steps of: receiving (801) by the second wireless network (Se-PLMN) an identifier of the mobile device; verifying (802), in an immutable distributed database hosted by a first wireless network operator (Fi-MNO) and the
(Continued)

second mobile network operator (Se-MNO) in which data is replicated across a plurality of compute nodes of a network, if at least a published assertion comprising said identifier of the mobile device demonstrates that the user owns a first subscription to the first mobile network operator (Fi-MNO), said subscription allowing said first operator (Fi-MANO) to be charged by the second mobile network operator (Se-MNO) for the establishment of a wireless communication over the second wireless network; in case of a positive verification, granting the establishment of a wireless communication (804) over the second wireless network (Se-PLMN) for the mobile device to be provisioned with a second subscription of a third wireless network operator (Th-MNO).

10 Claims, 7 Drawing Sheets

(51) Int. Cl.
| | | |
|---|---|---|
| *H04L 29/06* | (2006.01) | |
| *H04W 12/10* | (2021.01) | |
| *H04W 12/30* | (2021.01) | |
| *H04W 76/10* | (2018.01) | |
| *G06F 16/27* | (2019.01) | |
| *H04W 4/70* | (2018.01) | |
| *H04L 9/30* | (2006.01) | |

(52) U.S. Cl.
CPC ......... *H04L 63/0823* (2013.01); *H04W 12/04* (2013.01); *H04W 12/10* (2013.01); *H04W 12/35* (2021.01); *H04W 76/10* (2018.02); *H04L 9/3073* (2013.01); *H04L 2209/38* (2013.01); *H04W 4/70* (2018.02)

(56) References Cited

U.S. PATENT DOCUMENTS

| | | | |
|---|---|---|---|
| 2015/0044989 A1* | 2/2015 | De Foy | H04M 15/64 |
| | | | 455/406 |
| 2015/0269570 A1 | 9/2015 | Phan et al. | |
| 2016/0098723 A1 | 4/2016 | Feeney | |

FOREIGN PATENT DOCUMENTS

| | | | | |
|---|---|---|---|---|
| EP | 3151144 A1 * | 4/2017 | ......... | H04L 63/0236 |
| WO | WO-2014000157 A1 * | 1/2014 | ............. | H04W 4/50 |
| WO | WO2014000157 A1 | 1/2014 | | |
| WO | WO2015056008 A1 | 4/2015 | | |

OTHER PUBLICATIONS 16305645.0-1870, Partial European Search Report, dated Oct. 31, 2016, European Patent Office 80298 Munich, Germany.

Jover Roger Piqueras et al: "dHSS—distributed Peer-to-Peer implementation of the LTE HSS based on the bitcoin/namecoin architecture", 2016 IEEE International Conference on Communications Workshops (ICC), IEEE, May 23, 2016, pp. 354-359, XP032919891, DOI: 10.1109/ICCW.2016.7503813 [retrieved on Jul. 5, 2016].

Sanjay Panikkar: "ADEPT: An IoT Practitioner Perspective Draft Copy for Advance Review II. Key Objectives for Proof of Concept", Jan. 7, 2015, XP055282419, Retrieved from the Internet: URL:https://ia802601.us.archive.org/4/items/pdfy-esMcC00dKmdo53-_IBM ADEPT Practioner Persepective - Pre Publication Draft - 7 Jan 2015.pdf [retrieved on Jun. 21, 2016].

16305645.0-1870, Extended European Search Report, dated Dec. 22, 2016, European Patent Office 80298 Munich, Germany.

PCT/EP2017/062232 International Search Report, dated Jul. 11, 2017, European Patent Office, P.B. 5818 Patentlaan 2 NL-280 HV Rijswijk.

PCT/EP2017/062232 Written Opinion of the International Searching Authority, dated Jul. 11, 2017, European Patent Office, D-80298 Munich, Germany.

* cited by examiner

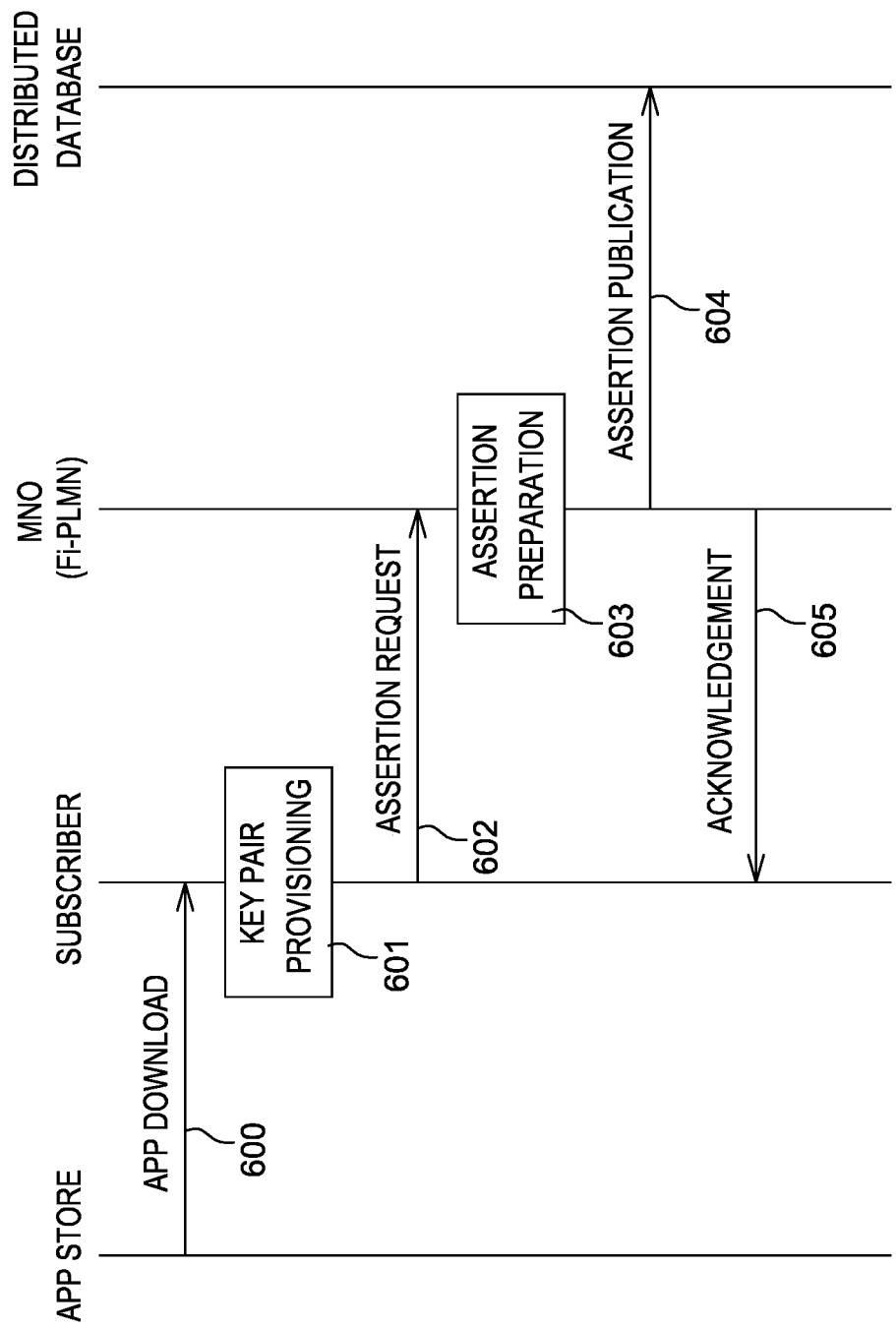

METHOD AND AN APPARATUS FOR PUBLISHING ASSERTIONS IN A DISTRIBUTED DATABASE OF A MOBILE TELECOMMUNICATION NETWORK AND FOR PERSONALISING INTERNET-OF-THINGS DEVICES

TECHNICAL FIELD

The present invention relates to a method and an apparatus for publishing assertions in a distributed database of a mobile telecommunication network, and more particularly to the technical domain of distributed databases and the Internet of Things (IoT).

BACKGROUND OF THE INVENTION

IoT devices without a subscription with a Mobile Operator to access a 3GPP network are considered for the fifth generation wireless systems, commonly designated as 5G. Until now, devices without a subscription can only access 3GPP network for limited emergency services.

In 5G networks, it is anticipated that some IoT devices would not have an initial subscription with any operators. Such devices would still be able to access 3GPP network and use 3GPP resources in order first to obtain a 3GPP subscription. Then, the device would use the downloaded subscription to access the network as it is done today.

A first issue for the Mobile operator is, from the regulation point of view, that the operator needs to be able to associate the device with a Subscriber prior to allowing access to the device to access its network.

A second issue is, from the operational point of view, that the Mobile Operator needs to be able to charge someone for this first connection.

There are today solutions developed by the Global System for Mobile communication Association (GSMA) that rely on a bootstrap subscription. Such solution presents several drawbacks, as it would require the manufacturers to have pre-personalized their devices with such bootstrap subscription, fostering costs overhead.

Another issue with such bootstrap subscription is that contrarily to car manufacturers, IoT device manufacturers may produce hundred thousands of devices that may never be actually activated so that the costs overhead may never be recovered.

Using a device certificate (and public/private key pair) stored in the device could be a solution. However, such system would require a Public Key Infrastructure (Certificate Authority, Certificate Revocation List) which is costly. Such cost structure is not adapted to such IoT market. It would also require root of trusts (root certificate) on a per country basis which is incompatible with Telecom worldwide market.

Using pre-shared keys inside the device would require either the device manufacturer or another entity to store such pre-shared keys. Such entity would need to be accessible and trusted by the Operator. This case is equivalent to the initial subscription case, with associated cost overhead.

SUMMARY OF THE INVENTION

This invention relates to a method for granting, for a mobile device which is not provisioned with a subscription to access a wireless network, the establishment of an initial wireless communication over a second wireless network operated by a second wireless network operator, the mobile device belonging to a user, the method comprising the steps of:
receiving by the second wireless network an identifier of the mobile device;
verifying in an immutable distributed database hosted at least by a first wireless network operator and the second mobile network operator in which data is stored replicated across a plurality of compute nodes of a network if at least a published assertion comprising said identifier of the mobile device demonstrates that the user owns a first subscription to the first mobile network operator, said subscription allowing said first operator (Fi-MANO) to be charged by the second mobile network operator (Se-MNO) for the establishment of a wireless communication over the second wireless network;
in case of a positive verification, granting the establishment of a wireless communication over the second wireless network for the mobile device to be provisioned with a second subscription of a third wireless network operator.

According to an example, the method comprises the step of verifying that the first wireless network operator allows being charged by the second mobile network operator for the establishment of a wireless communication over the second wireless network.

According to an example, the second and the third mobile network operators are designating the same mobile network operator.

According to an example, the mobile device is associated to a secure element adapted to be provisioned with the subscription.

According to an example, an assertion published in the distributed database by a manufacturer of said secure element provides an identifier of the secure element and an indicator of the level of security offered by the secure element, said assertion allowing to propose the user a second subscription that takes into account said level of security.

According to an example, the method comprises the step of verifying that the mobile device belongs to the user, this verification being performed by checking if there is a published assertion in the distributed database identifying the user as the owner of the mobile device.

According to an example, the method according to any of the preceding claims, wherein the immutable distributed database is composed of a plurality of compute nodes named stakeholders, a stakeholder being registered with a trusted entity, an assertion publication being requested by a declaration entity and comprising at least an identifier of said declaration entity.

According to an example, the method comprises the step of verifying the level of security provided by a secure element embedded into the mobile device adapted to be provisioned with the second subscription by reading an assertion published in the immutable distributed database, said assertion linking an identifier of the secure element and the security level.

According to an example, the immutable distributed database is a Blockchain

This invention also relates to a mobile device which is not provisioned with a subscription to access a wireless network configured to:
send to the second wireless network an identifier of the mobile device so that the second wireless network operator is able to verify, in an immutable distributed database hosted by at least a first wireless network operator and the second mobile network operator in which data is stored replicated across a plurality of compute nodes of a network, if at least a published assertion comprising said identifier of the mobile device demonstrates that the user owns a first subscription to the first mobile network operator, said subscription allowing said first operator to be charged by the second mobile network operator for the establishment of a wireless communication over the second wireless network, the establishment of a wireless communication over the second wireless network being granted in case of a positive verification;

download a second subscription from a third wireless network operator.

According to an example, the mobile device comprises a secure element configured to be provisioned with the second subscription.

According to an example, the secure element is associated to a security level that is published in an assertion of the immutable distributed database.

This invention also related to a server of a second mobile network adapted for granting, for a mobile device which is not provisioned with a subscription to access a wireless network, the establishment of an initial wireless communication over a second wireless network operated by a second wireless network operator (Se-MNO), the mobile device belonging to a user, the server being configured to:

receive an identifier of the mobile device;

verify, by consulting an immutable distributed database hosted by at least a first wireless network operator and the second mobile network operator in which data is stored replicated across a plurality of compute nodes of a network, if at least a published assertion comprising said identifier of the mobile device demonstrates that the user owns a first subscription to the first mobile network operator, said subscription allowing said first operator to be charged by the second mobile network operator for the establishment of a wireless communication over the second wireless network;

grant, in case of a positive verification, the establishment of a wireless communication over the second wireless network for the mobile device to be provisioned with a second subscription of a third wireless network operator.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings:

FIG. 6 provides an example of a sequence diagram representing an enrolment phase of a user who would like to activate a newly purchased IoT device;

DETAILED DESCRIPTION

Figure 1:
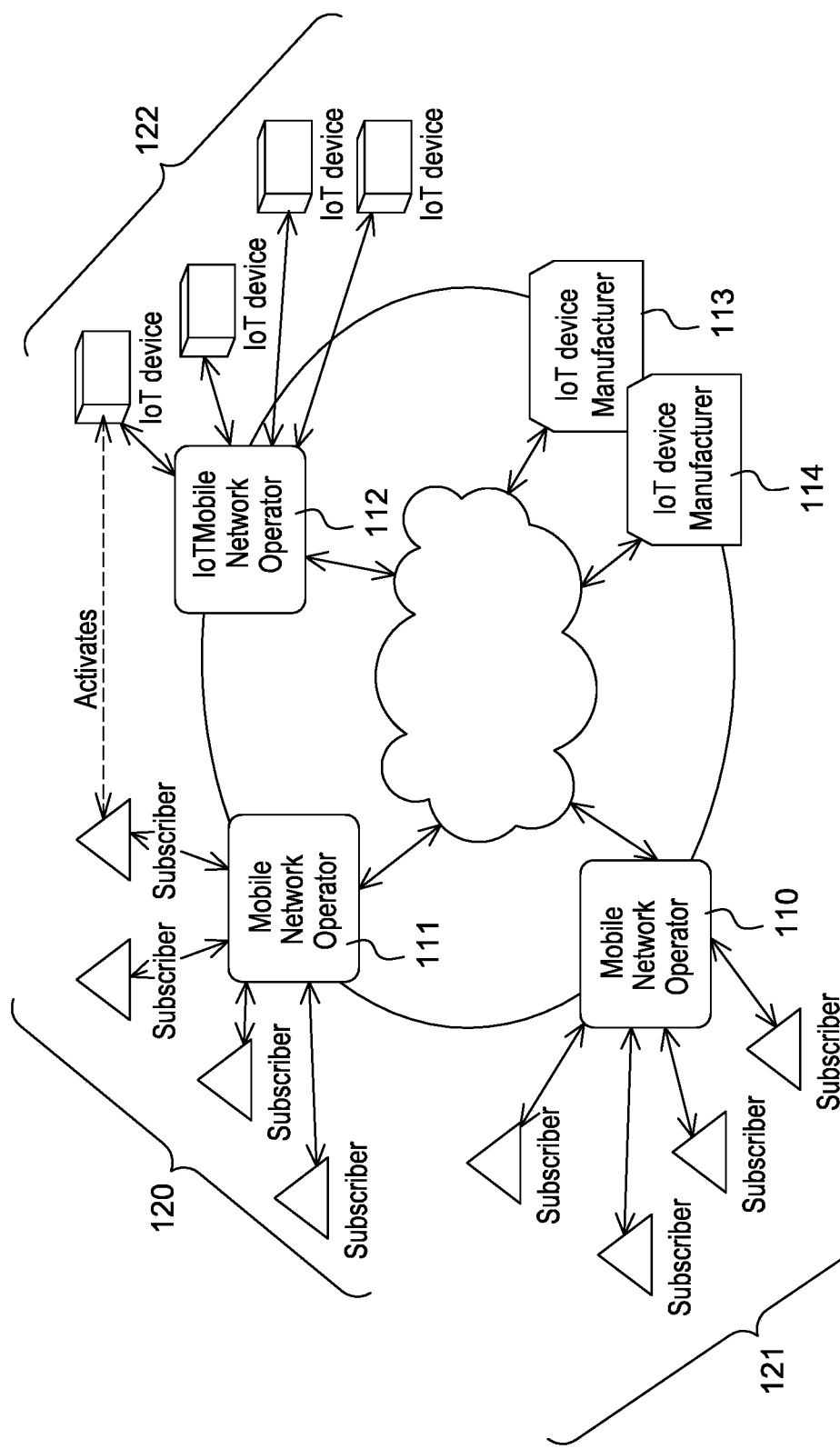
FIG. 1 is a schematic representation of a wireless system comprising a distributed data base used for publishing assertions that are validated and verified by a plurality of stakeholders.

FIG. 1 is a schematic representation of a wireless system comprising a distributed data base used for publishing assertions that are validated and verified by a plurality of stakeholders.

The system comprises a plurality of stakeholders 110-114. A stakeholder is a compute node that is operated by an actor of the wireless system. In this description a compute node refers to a device comprising hardware and software means to receive and transmit data on a communication network and executing programs. A computer connected to a network is an example of a compute node.

Various kind of stakeholders may operate their own compute node.

In this example, two compute nodes 110, 111 are operated respectively by a first and a second mobile network operator, one compute node 112 is operated by an IoT mobile network operator, and two compute nodes 113, 114 are operated respectively by a first and a second IoT device manufacturer.

The system also comprises other entities designated as declaration entities. A declaration entity is an entity that is able to request the publication of one or several assertions in a distributed database.

In this description, a distributed database refers to a database in which data is stored across a plurality of compute nodes of a network.

In the example provided with FIG. 1, are represented four mobile devices 121 used by four subscribers of the first mobile network operator four mobile devices 120 used by four subscribers of the second mobile network operator, and four IoT devices 122 used by four subscribers of the IoT mobile network operator.

In this description, an IoT device refers to a mobile device comprising a Machine to Machine communication module. Machine to Machine (M2M) refers to transmission of data from one terminal to another terminal or exchange of data between machines through GSM/GPRS, UMTS/HSDPA, CDMA/EVDO, LTE or other modules. At present, M2M is generally applied in the fields of security surveillance, automatic vending machines, public traffic systems, vehicle monitoring and management, industry process automatization, motor machineries, city informationalization, etc. In this example, these devices are not stakeholders and have only the role of declaring entity. However, a given actor of the system may also need to publish assertions in the distributed database. In that case, a given compute node may be configured to be a stakeholder and a declaring entity at the same time. This is the case for example for the two compute nodes 113, 114 operated, respectively, by IoT device manufacturers which can both operate a compute node that will be configured as such.

In the context of this particular example, the main functions of the different actors of the system are described thereafter.

A mobile network operator own its subscribers, or have access to the home operator (HPLMN) of a subscriber. It can be responsible for the enrolment of its subscribers on the distributed database. The MNO provide mobile devices access to its network resources such as its radio network, its subscription services and authentication function. The MNO is also responsible for verifying credentials and authenticating a mobile device. It can also verify the services subscribed by a user. Further, its network is configured to provide an access to the distributed database in order to verify the transactions of a specific device or subscriber. As already underlined, it can also be an actor in verifying and publishing signed assertion in the distributed database.

An IoT device manufacturer is an actor that manufactures IoT devices and, as an example, generates and stores pairs of public and private keys into the IoT devices. Such key pair can be used in the distributed database.

An IoT device is an example of declaring entity. It can provide a purchaser with an identifier of the IoT device, for example a public key that is readable on the box of the purchased device. The device is further configured to attach/connect to an IoT mobile network.

For cryptographic operation, or secure information storage, the IoT device can be associated to a secure element, for example an UICC, an eSE or an eUICC.

The secure element is for example a UICC (Universal Integrated Circuit Card). It can be in the format of a smart card, of a packaged chip, or any other format. It can be used in mobile terminals in GSM and UMTS networks for instance. The UICC ensures network authentication, integrity and security of all kinds of personal data.

The UICC mainly contains a SIM application for GSM/GPRS networks and in a USIM application for UMTS network it is the USIM application. For networks supporting Long-Term Evolution (LTE), the UICC contains an ISIM application. A UICC may also contain several other applications, making it possible for the same smart card to give access to UMTS and LTE networks, and also allows storage of a phone book as well as other types of services.

A UICC can normally be removed from a mobile terminal or an IoT device. After having inserted his UICC in his new terminal, the user will still have access to his applications, contacts and credentials (network operator).

The secure element can also be of eUICC type (embedded UICC). eUICCs are UICCs that are either soldered either not totally linked to devices but that are removable with difficulty because they are not intended to be removed, located in terminals that are distant or deeply integrated in machines. A special form factor of the UICC (very small for example and therefore not easy to handle) can also be a reason to consider it in fact as integrated in a terminal. Technologies that are implementing the functionalities of secure element by software can also be considered in the context of this invention.

A subscriber of a mobile network operator has a valid subscription with a Mobile Network Operator (MNO). The subscriber can also have its own Public/private key pair that can be used in the system, for example via its mobile network operator. The subscriber is the one that will be capable of activating the IoT device he has purchased.

To perform the cryptographic process leading to the activation of a given IoT device, the subscriber can be associated to a mobile device, for example a smartphone, or an application in a Secure Element.

The distributed database can integrate all valid assertions signed and verified by the stakeholders of the system. Those are accessible to the stakeholders of the system, each of whom is able to read a given assertion published in the system and to authenticate the declaration entity which required its publication.

Figure 2:
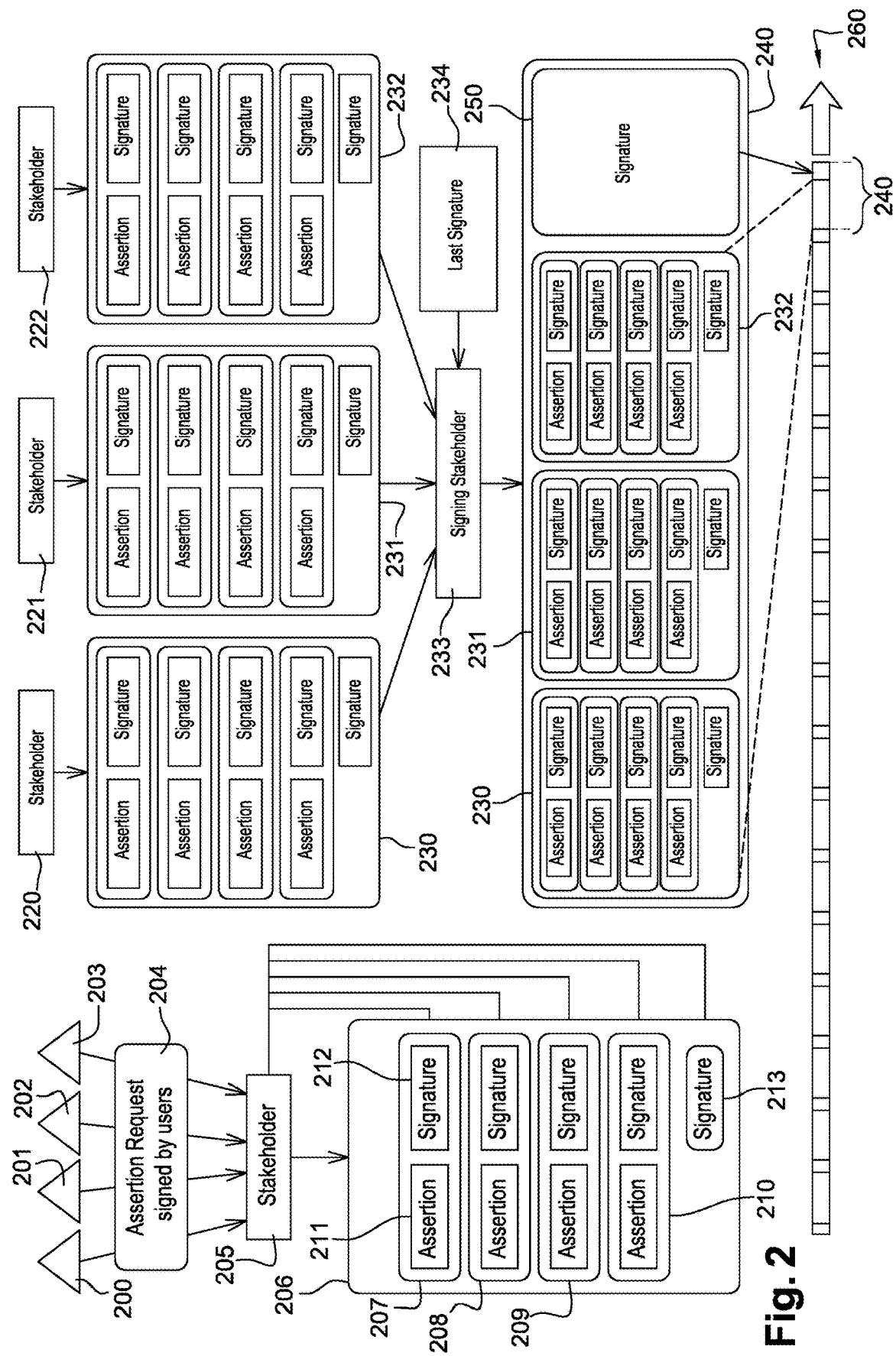
FIG. 2 illustrates an example of processing that can be carried out for publishing an assertion in the distributed database.

FIG. 2 illustrates an example of processing that can be carried out for publishing an assertion in the distributed database.

At a given processing period, a first stakeholder 205 collects four assertion requests 204 from four declaration entities 200-203. An assertion request is a message comprising at least a part of the information to be published by the stakeholders on the distributed database.

According to one embodiment of the invention, a key pair comprising a public and a private key is associated to each declaration entity. This type of key pair is designated as a declaration entity key pair or DE key pair. Further, the DE public key or the result of a one-way function or hash function (e.g. SHA-256) applied to the DE public key can be used as an identifier of the declaration entity. The declaration entity can use the private key of the DE key pair to sign the assertion request.

As an example, an assertion request comprises an identifier of a declaration entity, for example to the DE public key. It can also comprise a label indicating the subject of the assertion. This label is a digital sequence that can be later interpreted by a stakeholder.

Then, the first stakeholder can authenticate the declaration entities that have signed the assertion requests using their DE public key and generate an assertion block 206.

An assertion block 206 comprises all the assertions 207-210 that have been requested and validated by the first stakeholder 205 during a given processing period. It can be constructed by signing 212 each received assertion using the private key of the FS key pair and or alternatively by signing 213 the whole block, also using the private key of the FS key pair.

Then, the first stakeholder 205 sends the signed assertion block to a second stakeholder 233, for examplethe designated stakeholder for validation and publishing of all assertions in the current processing round).

During a given processing period, the second stakeholder 233 can receive none, one or several assertion blocks 230-232 emitted by one or several stakeholders 220-222. Then the second stakeholder will aggregate the received assertion blocks and sign the result of this aggregation in order to provide an aggregated assertion block 240.

The aggregated assertion block 240 can then be published 260 in the distributed database.

According to one embodiment, the signature 250 is generated thanks to a key pair that has been attributed to the second stakeholder. This key pair is designated as the second stakeholder (SeS) key pair and comprises an SeS private key and an SeS public key. In a preferred embodiment, the signing algorithm that is used takes as inputs the assertion blocks 230, 231, 232 received during the current processing period as well as the signature 234 that has been generated for the last aggregated assertion block published in the distributed database. The advantage of the process is to allow detection by any stakeholders of unauthorized insertion or deletion of previously signed aggregated assertion block in the distributed database. The addition of an aggregated assertion block into the database can only be performed at the end of the database. These properties makes that this distributed database comprising a continuously growing list of assertions or records is often designated as immutable. An example of immutable distributed database is Blockchain.

According to an embodiment of the invention, before publishing the signed aggregated assertion block, a verification is handled by all or part of the stakeholders of the distributed database.

Once the signed aggregated assertion block is published, any stakeholder can access to the published assertion, verify the signature of the aggregated assertion block and verify that a given assertion has been emitted by an identified declaration entity.

The skilled person will understand that a given stakeholder can implement as a whole the functions of both aforementioned 'first' and 'second' stakeholders.

It is important to note that unlike peer-to-peer databases such as blockchain when applied to Bitcoin, only the stakeholders of the system can have access to the published assertions. For that purpose, a stakeholder needs to be registered to a trusted third party. This trusted party can be implemented by a compute node which itself is a stakeholder. As an example, the trusted third party TTP1 is the first registered stakeholder of the system. When a new actor wants to join the scheme, it has first to register to one of the stakeholders, for example to TTP1. Then, as an example, TTP1 verifies the credentials and capabilities of the new actor. If the verification is successful, TTP1 can provide an assertion to the stakeholder generating the signed aggregated assertion block showing that NA is registered by TTP1. Once the new actor registration assertion is published to the distributed database, the new actor is registered and become a new stakeholder of the scheme. This new stakeholder can then register new actors and generate assertions blocks and aggregated assertion blocks to be published to the distributed database.

A key pair comprising a public and a private key is allocated to each registered stakeholder. This corresponds to the FS and SeS key pairs that are respectively allocated to the first and the second stakeholders mentioned for explanatory purpose with FIG. 2.

A given stakeholder knows the public keys of all registered stakeholder. Therefore, they are capable of verifying at any time that a given aggregated assertion block or a given assertion block has been correctly signed by an authorized (i.e. registered) stakeholder.

Figure 3:
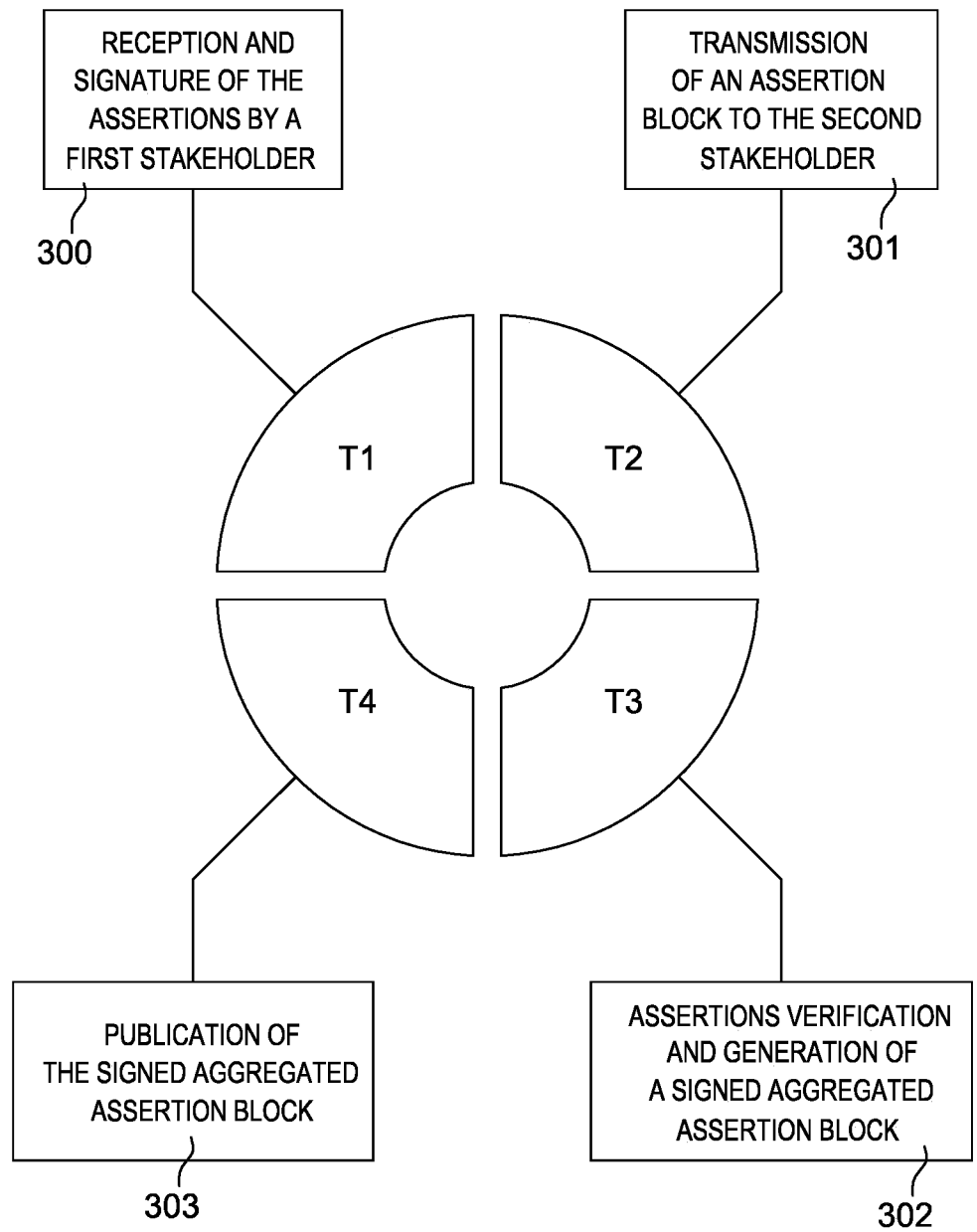
FIG. 3 shows schematically how the processes leading to the publications of one or several assertions can be organized in time.

FIG. 3 shows schematically how the processes leading to the publications of one or several assertions can be organized in time.

In this example, a processing cycle is composed of four processing periods T1, T2, T3 and T4 of specified durations that may depends on the system attributes such as the number of stakeholders or the number of assertions to be processed, load of the system.

During the first processing period, the assertions are received by a first stakeholder. An assertion block composed of one or several assertions is generated and signed 300.

During the second processing period, the signed assertion block is transmitted 301 by the first stakeholder to a second stakeholder. The second stakeholder can be chosen based on a predetermined schedule, a given stakeholder being designated for each processing period as the one that will generate the aggregated assertion blocks. Alternatively, the second stakeholder can be chosen randomly.

During the third processing period, the second stakeholder generate and sign 302 an aggregated assertion block.

During the fourth processing period, all the stakeholders of the system verify the validity of the signed aggregated assertion block and in case of a positive verification, the block is published 303 in the distributed database.

The sequence of processing period is provided for exemplary purpose. The skilled person will understand that the sequence of processing period can be handled differently. For example, processes for generating and signing 300 an assertion block and for transmission 301 of the signed assertion block can be handled in a first processing period and processes for generating and signing 302 an aggregated assertion block and for publishing 303 a block can be handled in a second processing period.

Figure 4:
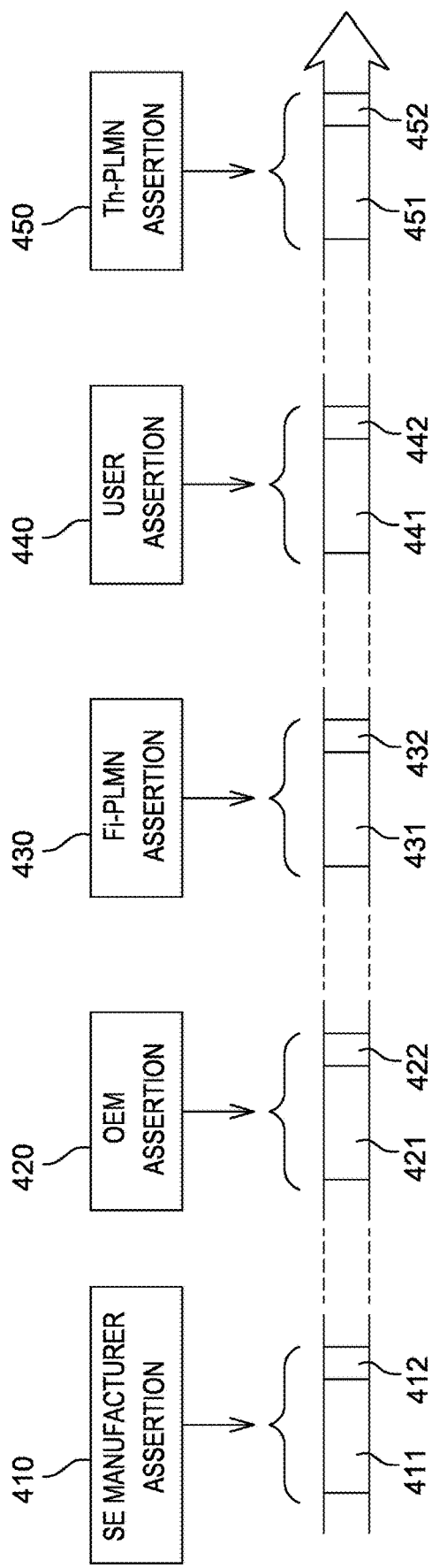
FIG. 4 illustrates a sequence of published assertions that can be used to check that an IoT device is allowed for a first connection on a given wireless network without having an initial subscription.

FIG. 4 illustrates a sequence of published assertions that can be used to check that an IoT device is allowed for a first connection on a given wireless network without having an initial subscription.

The example below is described with the example of IoT devices which are not provisioned with an initial subscription. However, the skilled person will understand that the invention is applicable to other types of mobile devices such as smartphones or tablet computers. This example is a use case in which the assertion publication mechanism on a distributed database can be advantageously used.

An IoT device which has no pre-loaded subscription typically requires to initially connect to a given wireless network in order to download a subscription and to then access normally to a wireless network which may be the same or different from the one used for the initial connection.

The wireless network that will be used for the initial connection needs to be sure that it will be able to charge for the resources made available to the IoT device. For that purpose, the wireless network can read one or several assertions published on the distributed database and which are linked directly or indirectly to this IoT device.

In this example, five assertions 410, 420, 430, 440, 450 are related directly or indirectly to the IoT device. These assertions have been published following the requests of different declaration entities in five aggregated assertion blocks 411, 421, 431, 441, 451 associated respectively to five signatures 412, 422, 432, 442, 452. As a reminder, the published assertions are accessible by all the registered stakeholders of the system.

The first published assertion 410 relates to the secure element that will store the future subscriptions that will be downloaded later on. This assertion can be provided by the manufacturer of the secure element and comprises an identifier of the secure element as well as other information such as the security level that is guaranteed when using it. In that case, the declaration entity is a compute node operated by the manufacturer of the secure element.

This secure element can be provided to an original equipment manufacturer (OEM) that will integrate it into an IoT device. The OEM then requests the publication of an assertion 420 stating that an IoT device has been manufactured with this secure element. For that purpose, the assertion can be made of the identifier of the secure element associated to an identifier of the IoT device. This assertion therefore creates a link between the IoT device and its secure element. In that case, the declaration entity is a compute node operated by said OEM.

The third published assertion 430 is requested for example by a first wireless network herein designated as the First Public Land Mobile Network (Fi-PLMN) operated by a first mobile network operator (Fi-MNO) and for which a user owns a valid subscription allowing him to connect at least one device, for example a smartphone, to this network. The assertion comprises for example an identifier for the Fi-PLMN and an identifier of the user. Therefore, any registered stakeholder can check whether or not a given user associated to a given identifier has a valid subscription for accessing to a wireless network. In that case, the declaration entity is a compute node operated by the mobile network operator of Fi-PLMN.

The fourth published assertion 440 is requested for example by the purchaser of the IoT device, hereafter called the "user". The user request to publish an assertion by a mobile device such as a smartphone that is different from the purchased IoT device and which is associated to the user's subscription with a Mobile Network Operator (MNO). The user can for example download an applet on its smartphone for requesting the publication of said assertion. The assertion 440 can then be made of an identifier of the subscriber associated to an identifier of the purchased device. This published assertion creates a link between the user and the IoT device. Therefore, a stakeholder that reads this published assertion 440 is able to check that the IoT device belongs to a user having regularly bought the device. In that case, the declaration entity is the device on which the user is identified as a regular subscriber.

When the IoT device initially attempts to connect to a wireless network designated here as the Second Public Land Mobile Network (Se-PLMN) and which is not necessarily the same as the Fi-PLMN, it can be advantageously checked whether the Se-PLMN is able to charge the user for the use of its network. For that purpose, a compute node owned by the Se-PLMN and which is registered as a stakeholder of the distributed database can check that the IoT device is associated with a given user by reading and authenticating assertion 440, then check if this user is associated to a valid subscription that will allow to charge of this initial connexion. If yes, the initial connection is granted and it can be proposed for the user to download a subscription profile. This subscription profile may be associated to Fi-PLMN, Se-PLMN or any other wireless network designated as Third Public Land Mobile Network (Th-PLMN). The user may have to choose between several different subscriptions associated to different wireless networks. Further, the level of security provided by the IoT device can be taken into account to propose the user with different subscription options. According to one aspect of the invention, the level of security can be traced back by reading and authenticating assertion 420 and then go to assertion 410 which can embed an indicator of the level of security provided by the secure element integrated into the IoT device.

The different subscription options can for example be displayed on the user's smartphone and one of them can be selected by interacting with a touch screen.

When the user, that is to say the owner of the IoT device, has selected a given subscription profile associated to Th-PLMN, an assertion 450 can be published in the distributed database. This publication is for example requested by a compute node operated by the mobile network operator of Th-PLMN. The assertion can comprise an identifier of the IoT device as well as an identifier of Th-PLMN.

In this example, it appears that the content of an assertion generally contains one or several identifiers of entities of the distributed database. This identifier refers for example to a registered stakeholder, a declaration entity, or to an entity having both qualities.

According to one aspect of the invention, when an assertion contains more than one identifier, it indicates a link between the identified entities, for example a link between a user and an MNO (or wireless network), a link between an IoT device and a secure element, etc.

According to a preferred embodiment of the invention, a public key of a key pair comprising a public and a private key or a quantity derived from a public key of a key pair such as the result of a hash function (SHA-256) applied to the public key can be used as an identifier.

An assertion can also contain a subject of the assertion. For example, a label materialized by a sequence of bits can refer to a particular type of assertion. Alternatively, it can be materialized by a Universal Resource Identifier (URI).

Other data can also be provided in an assertion such as the level of security provided by a given secure element.

Figure 5A:
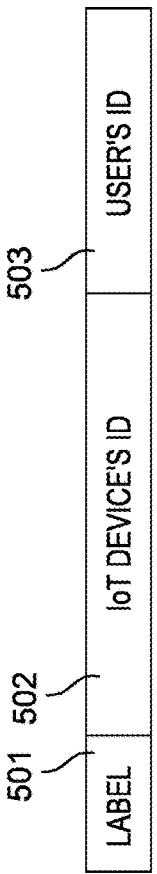
FIGS. 5A, 5B and 5C provide three examples of formats that can be used for an assertion to be published.
Figure 5B:
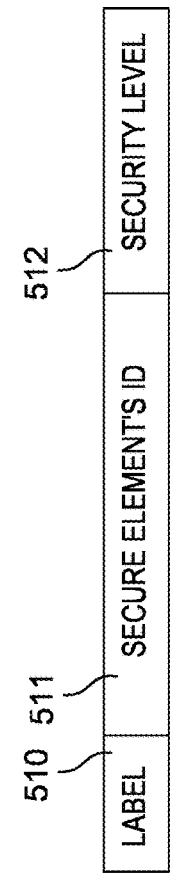
Figure 5C:
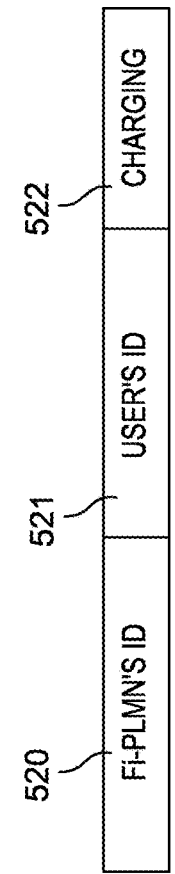

FIGS. 5A, 5B and 5C provide three examples of formats that can be used for an assertion to be published.

In FIG. 5A, the assertion contains a label 501 indicating that this assertion's purpose is to link an IoT device with an identified purchaser and the corresponding identifiers 502, 503 are provided with the assertion.

In FIG. 5B, the assertion contains a label 510 indicating that this assertion aims at declaring that a secure element is now available for being associated with a device, for example an IoT device. Therefore, an identifier of the secure element in provided 511. Additionally, a field 512 of the assertion provides an indicator of the level of security offered by the identified secure element.

In FIG. 5C, an example of assertion is provided with the aim of linking a wireless network with a user. A first field 520 provide an identifier of a wireless network Fi-PLMN for which a given user has a subscription. A second field 521 provides an identifier of said users. As already underlined, this identifier can be a public key of a key pair that is attributed to said user during an enrolment phase. This is particularly useful in order to avoid the publication of identifiers such as the International Mobile Subscriber Identifier (IMSI) that the mobile network operator prefer to keep secret. Then, a third field 522 provides an indication to any registered stakeholder that the user's subscription allows another wireless network to charge Fi-PLMN for the initial subscription of an IoT device.

The skilled person will understand that these examples of assertions formats are provided for exemplary purpose only and that other structures, combinations and contents can be also considered in the context of this invention.

FIG. 6 provides an example of a sequence diagram representing an enrolment phase of a user who would like to activate a newly purchased IoT device.

According to this example, a user has a valid subscription with a mobile network operator. Using its smartphone and this subscription, the user is able to download 600 an application for managing its IoT devices. This process can also comprise an authentication step (not represented). Once the application is downloaded and the user authenticated, a user's key pair is generated 601 in such a way that it is unique for this user. According to one embodiment, this user's key pair is generated by the user's device, for example a smartphone. Alternatively, the user's key pair can be generated by the network. In that case, a secure communication channel is needed for provisioning the subscriber's device with the key pair. Then, an assertion request 602 is sent by the user thanks to its smartphone towards the MNO to assert that the user is a valid subscriber of this MNO. The assertion request comprise for example an identifier of the user. This identifier corresponds for example to the public key of the user's key pair.

Once the assertion request 602 is received by the mobile network operator, the assertion itself can be generated 603. In this example, the assertion comprise a label indicating that the subject of the assertion is to declare the identified user as a subscriber of the MNO, the identifier of the user and an identifier of the MNO. As described thanks to FIG.

2, this assertion can then be added to a signed assertion block by a first stakeholder and then be transmitted to a second stakeholder that will aggregate several assertion blocks and sign this aggregation in order to generate a signed aggregated assertion block. This process will lead to the publication 604 of the assertion in the distributed database. Then, an acknowledgement message 605 can be transmitted to the user's smartphone indicating that the enrolment process has been correctly completed.

Figure 7:
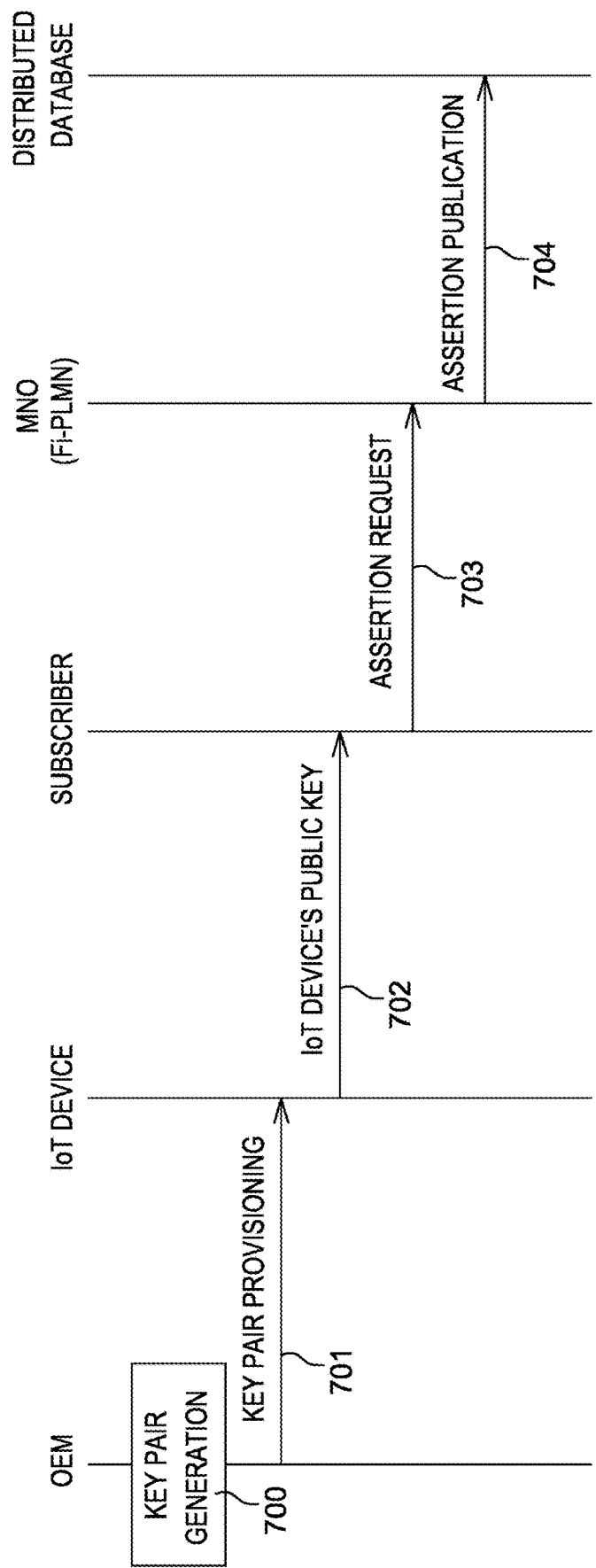
FIG. 7 provides an example of a sequence diagram representing a declaration of a newly purchased IoT device.

FIG. 7 provides an example of a sequence diagram representing a declaration of a newly purchased IoT device.

The IoT device is provided by the OEM. For that purpose, during the manufacturing phase, the OEM generates 700 a key pair that will be attributed and provisioned 701 in the IoT device. According to an alternative embodiment, the key pair attributed to the IoT device can be obtained by the OEM from a trusted third party.

When a user is enrolled as a subscriber of a given MNO (see FIG. 6 for example), he is able to activate its newly acquired IoT device. For that purpose, an assertion request 703 is sent to the MNO. This assertion request comprises for example a label indicating that the subject of the assertion is to declare the purchase of an IoT device by an identified user, an identifier of the IoT device (the IoT device's public key) 702 and an identifier of the MNO. Then, the assertion corresponding to this request can be published 704 on the distributed database.

According to one aspect of the invention, the identifier of the MNO is a public key which belongs to a public/private key pair that has been attributed to the compute node operating as a stakeholder of the distributed database.

According to the invention, a stakeholder is an entity that participates to the publication of assertions in the distributed database. A key aspect of the invention is that the stakeholders are registered to a trusted third party. During the registration process, a public/private key pair can be attributed to the stakeholder and the public key of this key pair can be used as an identifier of the stakeholder.

Figure 8:
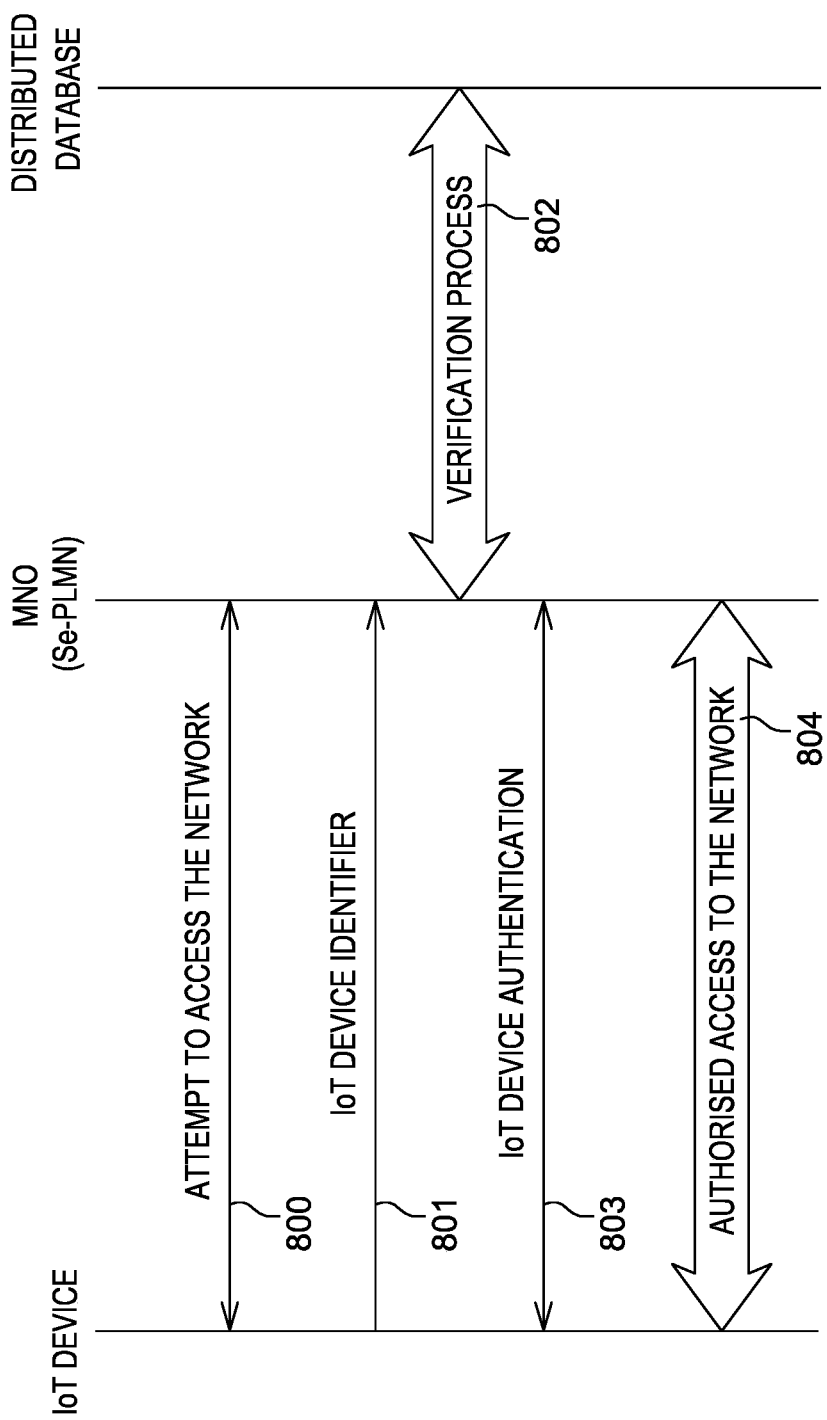
FIG. 8 provides an example of a sequence diagram illustrating the initial connexion of an IoT device.

FIG. 8 provides an example of a sequence diagram illustrating the initial connexion of an IoT device.

According to this example, the purchaser of the IoT device is registered as a subscriber with an MNO accepting to be charged for the initial connexion of a registered IoT device. The newly acquired IoT device has been declared and a corresponding assertion is published on the distributed database.

When the user switches on its newly acquired IoT device, it attempts to connect 800 to one of the wireless network it has detected, for example a 3GPP network. The IoT device sends 801 its identifier to the network, for example a public key of a provisioned key pair that has been attributed to this device. Then, a verification process 802 starts. A stakeholder that is operated by the mobile network operator then verifies that the IoT device belongs to a user which is associated to a subscription allowing the charging of this initial connection. For that purpose, the stakeholder reads the assertions published on the data base. Referring to the example of FIG. 4, it will first reads the assertion 440 which links the IoT device to its identified owners, then it will be able to jump to assertion 430 and get the information about the subscription the owner is associated with.

Once this verification is done, the device can be authenticated 803 by generating a digital signature using for example the private key of the key pair attributed to the IoT device. The stakeholder of the mobile network operator will then be able to verify this signature using the public key of the IoT device key pair. If this authentication phase succeeds, the IoT device is then authorized to access the wireless network 804 in order to download a subscription for this IoT device.

The MNO operating the Fi-PLMN will then be able to charge the MNO operating the Se-PLMN for the initial connection.

A subscription that is loaded generally refers to a data set allowing a mobile device to connect to a wireless network. The data set is sometimes called subscription profile and can contain an identifier of the subscriber, for an International Mobile Subscribed Identity (IMSI) and one or several security keys required for authentication and/or encryption.

The invention claimed is:

1. A method for granting, for a mobile device which is not provisioned with a subscription to access a wireless network, the mobile device being associated to a secure element adapted to be provisioned with a mobile network subscription, the establishment of an initial wireless communication over a second mobile network operated by a second mobile network operator, the mobile device belonging to a user, the method comprising the steps of:
   receiving by the second mobile network an identifier of the mobile device;
   verifying, in an immutable distributed database hosted at least by a first mobile network operator and the second mobile network operator in which the same data is stored replicated across a plurality of compute nodes of a network, if at least a published assertion comprising said identifier of the mobile device demonstrates that the user owns a first subscription to the first mobile network operator, said first subscription allowing said first mobile operator to be charged by the second mobile network operator for the establishment of a wireless communication over the second mobile network;
   in case of a positive verification, granting the establishment of a wireless communication over the second mobile network for the mobile device to be provisioned with a second subscription of a third mobile network operator; and
   publishing an assertion in the immutable distributed database providing an identifier of the secure element and an indicator of the level of security offered by the secure element.

2. The method according to claim 1, further comprising the step of verifying that the first mobile network operator allows being charged by the second mobile network operator for the establishment of a wireless communication over the second mobile network.

3. The method according to claim 1, wherein the second mobile network operator and the third mobile network operator are designating the same mobile network operator.

4. The method according to claim 1, wherein the assertion published in the immutable distributed database providing an identifier of the secure element and an indicator of the level of security offered by the secure element is published by a manufacturer of said secure element, said assertion allowing to propose the user a second subscription that takes into account said level of security.

5. The method according to claim 1, further comprising a step of verifying that the mobile device belongs to the user, this verification being performed by checking if there is a published assertion in the immutable distributed database identifying the user as the owner of the mobile device.

6. The method according to claim 1, wherein the immutable distributed database is composed of a plurality of compute nodes named stakeholders, a stakeholder being registered with a trusted entity, an assertion publication being requested by a declaration entity and comprising at least an identifier of said declaration entity.

7. The method according to claim 1, comprising the step of verifying the level of security provided by a secure element embedded into the mobile device adapted to be provisioned with the second subscription by reading the assertion published in the immutable distributed database providing an identifier of the secure element and an indicator of the level of security offered by the secure element is published, said assertion linking the identifier of the secure element and the security level.

8. The method according to claim 1, wherein the immutable distributed database is a blockchain.

9. A mobile device which is not provisioned with a subscription to access a mobile network, comprising:
a secure element;
configured to:
send to a second mobile network an identifier of the mobile device so that the second mobile network operator is able to verify, in an immutable distributed database hosted by a first mobile network operator and the second mobile network operator in which data is replicated across a plurality of compute nodes of a network, if at least a published assertion comprising said identifier of the mobile device demonstrates that the user owns a first subscription to the first mobile network operator, said first subscription allowing said first mobile operator to be charged by the second mobile network operator for the establishment of a wireless communication over the second mobile network, the establishment of a wireless communication over the second mobile network being granted in case of a positive verification;
download a second subscription from a third wireless network operator (Th-MNO) into the secure element, wherein the secure element is associated to a security level that is published in an assertion of the immutable distributed database.

10. A server of a second mobile network adapted for granting, for a mobile device which is not provisioned with a subscription to access a wireless network, the establishment of an initial wireless communication over a second mobile network (Se-PLMN) operated by a second wireless network operator, the mobile device belonging to a user, the server being configured to:
receive an identifier of the mobile device;
verify, by consulting an immutable distributed database hosted by a first wireless network operator and the second mobile network operator in which data is replicated across a plurality of compute nodes of a network, if at least a published assertion comprising said identifier of the mobile device demonstrates that the user owns a first subscription to the first mobile network operator, said first subscription allowing said first mobile operator to be charged by the second mobile network operator for the establishment of a wireless communication over the second wireless network;
grant, in case of a positive verification, the establishment of a wireless communication over the second mobile network for the mobile device to be provisioned with a second subscription from a third wireless network operator; and
publish an assertion in the immutable distributed database providing an identifier of a secure element associated with the mobile device and an indicator of the level of security offered by the secure element.

* * * * *